(12) United States Patent
Biyikli

(10) Patent No.: US 6,784,416 B2
(45) Date of Patent: Aug. 31, 2004

(54) POLARIZATION TRANSFORMER AND POLARIZATION MODE DISPERSION COMPENSATOR

(75) Inventor: Levent Biyikli, Cedar Park, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 76 days.

(21) Appl. No.: 10/036,637

(22) Filed: Dec. 31, 2001

(65) Prior Publication Data

US 2003/0122063 A1 Jul. 3, 2003

(51) Int. Cl.$^7$ .................................................. G02F 1/01
(52) U.S. Cl. ........................ 250/225; 356/501; 349/96
(58) Field of Search ..................... 359/501, 321–322

(56) References Cited

U.S. PATENT DOCUMENTS

| | | |
|---|---|---|
| 3,558,215 A | 1/1971 | De Lang et al. |
| 3,915,553 A | 10/1975 | Adams et al. |
| 4,541,691 A | 9/1985 | Buzak |
| 4,988,169 A | 1/1991 | Walker |
| 5,212,743 A * | 5/1993 | Heismann .................... 385/11 |
| 5,347,382 A | 9/1994 | Rumbaugh |
| 5,473,465 A | 12/1995 | Ye |
| 5,528,393 A | 6/1996 | Sharp et al. |
| 5,561,726 A | 10/1996 | Yao |
| 5,822,100 A | 10/1998 | Robinson et al. |
| 5,930,414 A * | 7/1999 | Fishman et al. ............... 385/11 |
| 6,046,786 A | 4/2000 | Sharp et al. |
| 6,130,766 A | 10/2000 | Cao |
| 6,236,495 B1 | 5/2001 | Moeller |
| 6,271,952 B1 | 8/2001 | Epworth |
| 6,282,333 B1 | 8/2001 | Dultz et al. |
| 6,330,375 B1 | 12/2001 | Fishman et al. |
| 6,373,614 B1 * | 4/2002 | Miller .......................... 359/237 |
| 6,384,956 B1 * | 5/2002 | Shieh ........................... 359/256 |
| 6,421,131 B1 * | 7/2002 | Miller .......................... 356/453 |
| 6,522,456 B2 * | 2/2003 | Chen et al. ................... 359/322 |
| 6,654,103 B2 * | 11/2003 | Yu et al. ...................... 356/73.1 |
| 2001/0028760 A1 | 10/2001 | Yaffe |

FOREIGN PATENT DOCUMENTS

| | | |
|---|---|---|
| DE | 198 39 308 A1 | 3/2000 |
| EP | 0 393 967 A2 | 10/1990 |
| EP | 0 663 604 A1 | 7/1995 |
| WO | WO 00/49438 A1 | 8/2000 |
| WO | WO 01/02799 A1 | 1/2001 |
| WO | WO 01/67167 A2 | 9/2001 |

OTHER PUBLICATIONS

Jungho Kim, et al., "Polarization–mode–dispersion Compensator Using a Polarization Beam Splitter and Quarter–Wave Plates", Applied Optics, vol. 40, No. 25, Sep. 1, 2001, pp. 4473–4475.

(List continued on next page.)

Primary Examiner—David Porta
Assistant Examiner—Patrick J. Lee
(74) Attorney, Agent, or Firm—Gregg H. Rosenblatt; Alan Ball

(57) ABSTRACT

A polarization transformer can be constructed using a continuously adjustable polarization transforming device and a limited-range adjustable polarization transforming device. In general, the response time of the limited-range adjustable polarization transforming device is faster than that of the continuously adjustable polarization transforming device. When the two devices are properly controlled using error signals derived from a transformed optical signal, the polarization state of the optical signal can be adjusted with sufficient speed and without the loss of control associated with reset cycles.

35 Claims, 3 Drawing Sheets

OTHER PUBLICATIONS

Yasuo Ohtera, et al., "*Liquid Crystal Rotatable Waveplates*", IEEE Photonics Technology Letters, vol. 8, No. 3, Mar. 1996, pp. 390–392.

Takafumi Chiba, et al., "*Polarization Stabilizer Using Liquid Crystal Rotatable Waveplates*", Journal of Lightwave Technology, vol. 17, No. 5, May, 1999, pp. 885–890.

N. G. Walker, et al., "*Endless Polarisation Control Using Four Fibre Squeezers*", Electronics Letters, Mar. 12, 1987, vol. 23, No. 6, pp. 290–292.

H. Shimizu, et al., "*Endless Polarisation Controller Using Electro–Optic Waveplates*", Electronics Letters, Mar. 31, 1988, vol. 24, No. 7, pp. 412–413.

R. Noé "*Endless Polarisation Control Experiment with Three Elements of Limited Birefringence Range*", Electronics Letters, Dec. 4, 1986, vol. 22, No. 25, pp. 1341–1343.

R. Noé "*Endless Polarisation Control in Coherent Optical Communications*", Electronics Letters, Jul. 17, 1986, vol. 22, No. 15, pp. 772–773.

T. Matsumoto, et al., "*Endlessly Rotatable Fractional–Wave Devices for Single–Mode–Fibre Optics*", Electronics Letters, Jan. 16, 1986, vol. 22, No. 2, pp. 78–79.

L. J. Rysdale, "*Method of Overcoming Finite–Range Limitation of Certain State of Polarisation Control Devices in Automatic Polarisation Control Schemes*", Electronics Letters, Jan. 16, 1986, vol. 22, No. 2, pp. 100–102.

\* cited by examiner

POLARIZATION TRANSFORMER AND POLARIZATION MODE DISPERSION COMPENSATOR

FIELD OF THE INVENTION

The present invention relates in general to the field of polarization transformation of light and, more particularly, to polarization transformation of optical signals exhibiting polarization mode dispersion.

BACKGROUND OF THE INVENTION

Single-mode optical fiber is used in a variety of telecommunications systems. Despite its name, single-mode optical fiber actually transmits light in two distinct polarization modes. In a perfectly symmetrical single-mode optical fiber, these two modes travel through the fiber in exactly the same manner and are otherwise indistinguishable. However, imperfections in the fiber, either created during manufacture or caused by some external force on the fiber, can cause the refractive index of the glass core to differ slightly for light in the two different polarization modes, an effect called birefringence.

Birefringence associated with an optical fiber will cause the light in the two different polarization modes to travel at differing speeds. The birefringence encountered can be both uniform (e.g., a uniform manufacturing defect) and random. If the light traveling down the fiber is a typical optical pulse train used for telecommunications, each pulse initially might have components in both polarization modes. After traveling a distance down the fiber the two polarization components of the pulses will be separated in time. This time separation is called differential group delay. The statistical accumulation of differential group delay due to random polarization shifts and distribution of birefringence in the optical fiber is known as polarization mode dispersion (PMD). If it is too great, PMD causes the pulses to spread out thereby making it difficult to resolve individual pulses and thus transmit data without introducing transmission errors.

Polarization mode dispersion occurs in an optical fiber as a result of a small residual birefringence that is introduced in the fiber core by asymmetric internal stress or strain as well as random polarization coupling due to external forces acting upon the fiber. Thus, polarization mode dispersion may severely impair the transmission of a signal in an optical fiber network. It is well known that polarization mode dispersion has different effects on certain polarization components of an optical signal propagating through an optical fiber transmission line, such that differential time delays occur among the components as they travel through the fiber. These differential time delays can range from about 0.1 ps/(km)$^{1/2}$ for low-PMD optical fibers of recent manufacture to several ps/(km)$^{1/2}$ for single-mode optical fibers of older manufacture. For long-distance optical fiber links, e.g., a 100 km terrestrial transmission system using single-mode fiber, the differential time delay that can result from polarization mode dispersion may be more than 20 ps. Large time delays occurring between different polarization components can cause significant broadening of the optical pulses propagating through an optical link. This is a particular problem in digital lightwave systems operating at bit periods comparable to PMD, e.g., at least 10 Gbps per transmitted-wavelength-channel.

If the birefringence causing polarization mode dispersion were stable over time, it would be relatively simple to correct for the problem. However, random or time-varying mechanical stress on the deployed fiber leads to unpredictable polarization mode dispersion. Similarly, dynamic environmental changes result in polarization mode dispersion changes that can last for variable periods of time and vary with wavelength. In addition to diurnal heating and cooling, even faster thermal and mechanical effects, such as vibration from passing vehicles, fiber movement in aerial spans, and cabling disturbances by workers can cause polarization mode dispersion that possesses even greater variability. The rapid variation of these effects (e.g., on the order of a fraction of a millisecond to tens of seconds) suggests the need for relatively rapid corrective systems to preserve the integrity and lower the error rate of the optical data transmission. Moreover, the unpredictable nature of the resulting polarizations suggests the need for corrective systems that can adapt to a wide range of changes in birefringence.

Most devices that are intended to mitigate the problems of PMD do so by applying an appropriate delay to the faster of the two polarization components that make up the PMD degraded optical pulses. To do so, these devices should continuously and rapidly transform the state of polarization of these two polarization components to a known state, thereby controlling the polarization states. Continuously adjustable or "endless" polarization transformers provide continuous control of the polarization state for a wide range of input polarizations. The simplest example is a rotatable wave plate. Unfortunately, most devices of this nature have relatively slow response times (perhaps on the order of tens or hundreds of milliseconds), and so they are not the most desirable devices to use to correct for polarization mode dispersion. A variety of devices with faster response times are available, but these devices generally have a limited range through which they can transform a polarization state and require resetting once they have reached their limit. Reset cycles can give rise to periods of unacceptable loss in overall system performance. In addition, multiple limited-range devices need to be combined in series, each device having a polarization transformation range that covers a range different from, but possibly overlapping with, the other devices. Such stacks of devices can still suffer from problems associated with reset cycles, as well as increased complexity and signal loss.

Accordingly, it is desirable to have polarization transforming devices, and particularly polarization transforming devices for use in polarization mode dispersion compensators, that have adequate response time and solve or alleviate the other problems of prior art devices.

SUMMARY OF THE INVENTION

It has been discovered that a polarization transformer can be constructed using a continuously adjustable polarization transforming device and a limited-range adjustable polarization transforming device. In general, the response time of the limited-range adjustable polarization transforming device is faster than that of the continuously adjustable polarization transforming device. When the two devices are properly controlled using error signals derived from a transformed optical signal, the polarization state of the optical signal can be adjusted with sufficient speed and without the loss of control associated with reset cycles.

Accordingly, one aspect of the present invention provides a polarization transformer operable to reorient polarization components of an incident optical signal. The polarization transformer includes a continuously adjustable retarder and a limited-range adjustable retarder. The continuously adjustable retarder is operable to provide reset-free operation and continuous control of a polarization state of the optical signal. The limited-range adjustable retarder is located in optical communication with the continuously adjustable retarder and is operable to provide limited-range control of the polarization state of the optical signal.

Another aspect of the present invention provides a system for compensating for polarization mode dispersion in an optical signal. The system includes a polarization transformer, a delay system, and a controller. The polarization transformer is operable to reorient polarization components of an incident optical signal and includes a continuously adjustable retarder and a limited-range adjustable retarder. The continuously adjustable retarder is operable to provide reset-free operation and continuous control of a polarization state of the optical signal. The limited-range adjustable retarder is located in optical communication with the continuously adjustable retarder and is operable to provide limited-range control of the polarization state of the optical signal. The delay system is operable to adjust the relative delay between a first reoriented polarization component of the optical signal and a second reoriented polarization component of the optical signal. The controller is coupled to the polarization transformer and is operable to provide control signals to the limited-range adjustable retarder and the continuously adjustable retarder.

These and other aspects of the invention have numerous advantages. For example, the present invention provides a polarization controller having fewer devices that need to be controlled. This is particularly useful since each device may need to be controlled individually by phase sensitive detection, and thus additional frequencies would need to be reserved in the network for dithering. Also, by decreasing the number of devices used in polarization transformation, lower insertion losses are achieved.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

The simplest polarization transforming devices typically include one or more optical elements known as retarders. The axes of the material exhibit different refractive index characteristics and are generally referred to as the fast (low index) and slow (high index) axes. Orthogonal polarization components of light that enter a retarder will experience a relative phase shift upon output. This phase shift is generally dependent upon the thickness of the retarding medium and the degree of difference between the refractive indices of the fast and slow axes called birefringence of the retarding medium. Throughout this application, basic polarization transforming devices will typically be referred to as retarders, as is well known to those having ordinary skill in the art.

Figure 1:
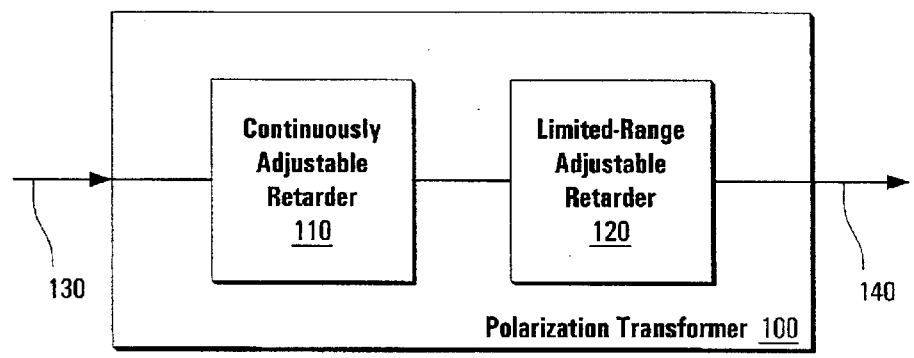
FIG. 1 illustrates a block diagram of a polarization transformer including a continuously adjustable retarder and a limited-range adjustable retarder.

FIG. 1 illustrates a block diagram of a polarization transformer 100 including a continuously adjustable retarder 110 and a limited-range adjustable retarder 120. Input optical signal 130, having a generally arbitrary polarization, is incident upon polarization transformer 100. Input optical signal 130 is typically an optical communications signal of the sort transmitted on optical fibers. However, the operation of polarization transformer 100 can be understood with respect to any polarized light source and in particular any coherent polarized light source.

Input optical signal 130 passes through continuously adjustable retarder 110 where its polarization is transformed based on the type of device used as continuously adjustable retarder 110 and any control signals applied to continuously adjustable retarder 110. For example, if continuously adjustable retarder 110 is a rotatable half-wave plate coupled to a motorized mount, control signals can be applied to the motorized mount to cause the half-wave plate to be rotated by a desired amount, thereby effecting a desired polarization transformation. Continuously adjustable retarder 110 is continuously adjustable or "endless" in that it provides continuous control of the polarization state over a virtually infinite range of input polarization. Continuously adjustable retarder 110 does not require resetting, with the associated undesirable reset cycle, because the range through which it can adjust polarization is not limited. In addition to conventional wave plates, a variety of different continuously adjustable retarders or combinations of retarders, as is well known to those having ordinary skill in the art, can be used to implement continuously adjustable retarder 110. For example, continuously adjustable retarder 110 can be constructed from lithium niobate devices, semiconductor devices, and liquid crystal devices such as vertically-aligned nematic liquid crystal cells using variable lateral electric fields.

The transformed optical signal passes from continuously adjustable retarder 110 to limited-range adjustable retarder 120. Note that in the example of FIG. 1, the order of polarization transforming devices is continuously adjustable retarder 110 first, and then limited-range adjustable retarder 120. This particular order need not be the case. For example, limited-range adjustable retarder 120 and continuously adjustable retarder 110 can be located with respect to each other such that the optical signal passes through limited-range adjustable retarder 120 first. Alternately, components of both continuously adjustable retarder 110 and limited-range adjustable retarder 120 can be intermingled so that the optical signal does not necessarily pass through one or the other first.

Limited-range adjustable retarder 120 is typically constructed from one or more retarders that have a limited range of polarization transformation but whose response time is shorter than that of continuously adjustable retarder 110. A variety of different technologies can be used to construct limited-range adjustable retarder 120 including: liquid crystal cells, lithium niobate crystals, lanthanum modified lead zirconate titanate (PLZT) materials, and mechanically or thermally stressed optical fiber. In general, any material or device exhibiting some degree of tunable birefringence and an adequate response time can be used for limited-range adjustable retarder 120. In some cases, for example liquid crystal cells, multiple devices may be combined to form limited-range adjustable retarder 120. In such cases the number of devices needed is typically less than would be needed if a continuously adjustable device were to be formed, thereby reducing the complexity and signal loss associated with the device.

Output optical signal 140 is the product of polarization transformation caused by both continuously adjustable retarder 110 and limited-range adjustable retarder 120. Output optical signal 140 possesses the desired polarization state based on control signals applied to polarization transformer 100. In many uses of polarization transformer 100, it will be desirable to configure the transformer to produce an output optical signal 140 having a specified output polarization regardless of the polarization of input optical signal 130. The combination of continuously adjustable retarder 110 and limited-range adjustable retarder 120 allows polarization transformer 100 to quickly respond to changes in the polarization state of input optical signal 130. In general, the overall response time of polarization transformer 100 will be approximately the same as that of the limited-range adjustable retarder 120 so long as continuously adjustable retarder 110 is fast enough to compensate for desired changes in polarization state that are outside the range of the devices used for limited-range adjustable retarder 120.

Figure 2:
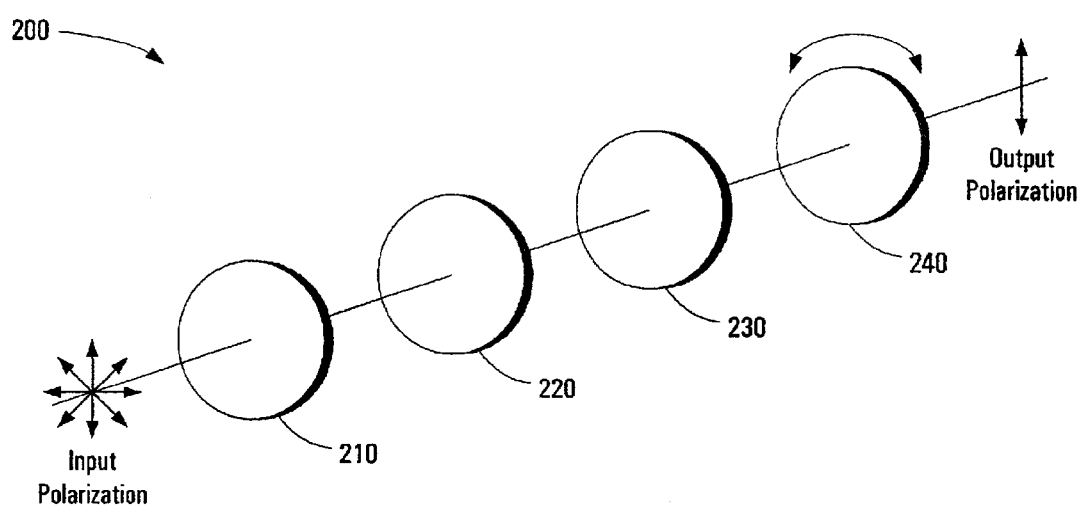
FIG. 2 illustrates one implementation of the polarization transformer of FIG. 1.

FIG. 2 illustrates one implementation of a polarization transformer 200. Liquid crystal half-wave retarders 210 and 230 are located on either side of fixed quarter-wave plate 220. Together, retarders 210, 220, and 230 form a limited-range adjustable retarder. In a typical implementation, each of liquid crystal retarders 210 and 230 is formed from one or more liquid crystal cells. A liquid crystal cell is usually constructed from a layer of liquid crystal material sandwiched between two transparent, or substantially transparent, windows. The windows are typically composed of a transparent substrate such as fused silica. Transparent electrically conductive electrodes, e.g., a one or more indium tin oxide (ITO) layers, can also be formed on the transparent substrate. The window must be sufficiently transparent at the wavelength of the optical signal so that there is not too much signal loss as the optical signal passes through the cell. The electrodes are present so that an appropriate controlling voltage can be applied to tune the cell, thereby adjusting the polarization of light passing through the cell. Alternately, a liquid crystal retarder can be formed from several liquid crystal cells, each having electrodes used to apply the tuning voltage. In one particular example, liquid crystal retarders 210 and 230 are each formed from three liquid crystal cells positioned in series. Two of the liquid crystal cells rotate the optical signal's polarization in one direction when an increasing voltage is applied, while the third liquid crystal cell rotates the optical signal's polarization in the opposite direction as the increasing voltage is applied. A variety of different liquid crystal materials can be used in liquid crystal retarders 210 and 230, including so-called analog liquid crystals based on nematic liquid crystal (NLC), ferroelectric liquid crystal (FLC), and fluorinated ferroelectric liquid crystal (fFLC) materials. Examples of fluorinated ferroelectric liquid crystal materials can be found in the U.S. Pat. No. 6,309,561 entitled "Liquid Crystal Compounds Having a Chiral Fluorinated Terminal Portion," naming Hasegawa et al. as inventors, which is hereby incorporated by reference herein in its entirety.

Operation of the limited-range adjustable retarder formed by retarders 210, 220, and 230 can better be understood by making reference to the polarization state representation using the Poincare sphere, as will be known to those having ordinary skill in the art. Polarization states can be represented as points on the Poincare sphere, and this representation is fully described in published literature, e.g. Rashleigh: "Origins and Control of Polarisation Effects in Single Mode Fibres", J Lightwave Technology Vol. LT 1 No 2 June 1983 p. 312–331. Any general elliptical polarization state is represented on the sphere by a single point S, and all possible polarization states lie on the sphere. Birefringence causes a change in polarization state from S to some other point on the sphere S' and thus a rotation about an axis passing through the center of the sphere, through an angle which depends on the magnitude of the birefringence. Consequently, transforming one arbitrary polarization state to another arbitrary polarization state requires rotations about two separate axes. Retarders 210 and 230 accomplish these separate rotations. However, in order for the rotations to be about two orthogonal axes for the example given here of two half-wave retarders 210 and 230, a 90° phase shift must be introduced by quarter-wave plate 220.

Rotatable half-wave plate 240 is used to implement the continuously adjustable retarder. As previously noted, such wave plates can be mounted on motorized rotation mounts or stages such that the wave plate can be continuously rotated. For example, such motorized rotation mounts can be controlled with positive and negative voltages to rotate the wave plate clockwise and counter-clockwise respectively. Because of the design of the limited-range adjustable retarder formed by retarders 210, 220, and 230, only a single rotatable half-wave plate 240 is used to implement the continuously adjustable retarder. However, in other designs the continuously adjustable retarder can include multiple wave plates and/or wave plates providing different amounts of retardation. Other types of retarders can be used in place of rotatable half-wave plate 240, including certain liquid crystal retarders (e.g., vertically-aligned nematic liquid crystal cells using variable lateral electric fields), birefringent crystals (e.g., lithium niobate devices), and semiconductor devices.

In general, those having ordinary skill in the art will readily recognize that a variety of different polarization transforming devices can be used to implement the aforementioned continuously adjustable and limited-range adjustable retarders.

Although not shown in conjunction with FIG. 2, controller(s) for both continuously adjustable and limited-range adjustable retarders are responsible for adjusting the retarders to produced the desired output polarization. In another example of polarization transformer 200, half-wave plate 240 is placed before retarders 210, 220 and 230, i.e., the optical signal passes through half-wave plate 240 first. In this implementation, one controller, or section of a larger controller, is used to adjust the polarization transformation caused by liquid crystal retarders 210 and 230. Another controller, or section of a larger controller, adjusts the setting of rotatable half-wave plate 240 in order to try to center the liquid crystal retarders 210 and 230 in their range of tunability. Thus, liquid crystal retarders 210 and 230 attempt to maintain the desired output polarization while the polarization of the signal received by the limited-range adjustable retarder is now governed by a combination of the original polarization of the input optical signal and the continuously adjustable retarder. Thus, the limited-range adjustable retarder formed from retarders 210, 220 and 230 need only compensate for the difference between the polarization as adjusted by rotatable half-wave plate 240 and the desired output polarization.

Figure 3:
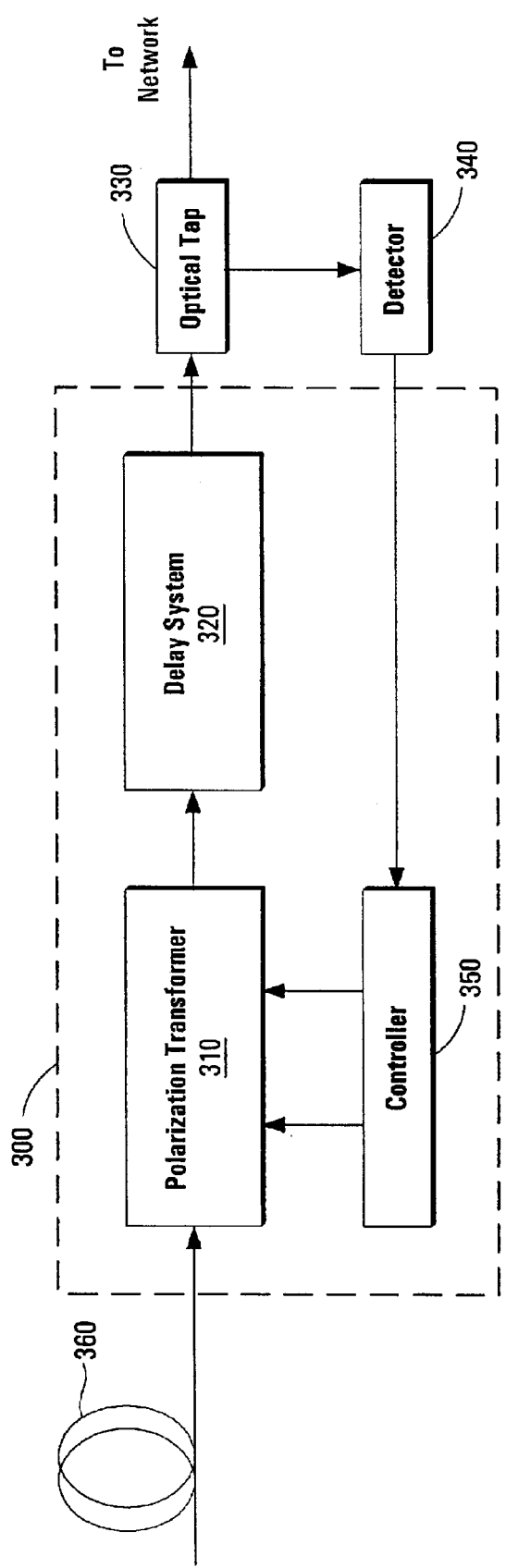
FIG. 3 illustrates a block diagram of a polarization mode dispersion compensator.

FIG. 3 illustrates a block diagram of polarization mode dispersion compensator 300. Polarization mode dispersion compensator 300 serves to reverse the pulse broadening effects that arise as an optical signal travels through, for example, single-mode optical fiber 360. In general, polarization mode dispersion compensator 300 transforms the polarization state of the optical signal arriving from single-mode optical fiber 360 into a known polarization state so that the transformed optical signal can be sent through a delay system to adjust the phase difference between polarization components of the optical signal causing the polarization mode dispersion. As illustrated, polarization mode dispersion compensator 300 includes polarization transformer 310, delay system 320, and controller 350. Polarization mode dispersion compensator 300 can also include other devices such as optical tap 330 and detector 340, or alternately, these devices (or their equivalents) can be part of the optical network in which polarization mode dispersion compensator 300 is used.

Once the optical signal exhibiting polarization mode dispersion is received from single-mode optical fiber 360, which is, for example, part of a telecommunications network, the optical signal is received by polarization transformer 310. Polarization transformer 310 includes both continuously adjustable and limited-range adjustable retarders, and thus the aforementioned polarization transformers 100 and 200 serve as examples of polarization transformer 310. Once the polarization state of the optical signal is transformed into a desired polarization state, the signal is received by delay system 320.

In one example, delay system 320 is a known-length span of polarization maintaining optical fiber. Polarization maintaining optical fiber has an internal strain or asymmetry causing the fiber to have a well-defined birefringence. When properly oriented so that the polarization components of the optical signal emerging from polarization transformer 310 coincide with the slow and fast axes (as appropriate) of the polarization maintaining optical fiber, the polarization maintaining optical fiber will delay one polarization component of the optical signal with respect to the other. The amount of delay introduced, and thus the degree to which the two polarization components are brought back into phase with each other, will generally depend on the length of the polarization maintaining optical fiber. Accordingly, it is important that polarization transformer 310 be able to transform the polarization of the optical signal in a manner appropriate for delay system 320.

Other examples of suitable devices, both fixed and variable, for use as delay system 320 are well known in the art. For example, variable delay elements include: optical fibers that are either squeezed or heated to alter propagation characteristics, systems including a series of optical switches connected in stages by different incremental lengths of optical fiber, and other tunable fiber delay lines. Such variable delay elements typically require control systems which would be included as part of delay system 320.

If the signal level of the optical signal is sufficiently high, or if polarization mode dispersion compensator 300 is inserted into a system at a point where signal loss is not critical, filtering devices can be used in place of delay system 320 to filter out one polarization component of the optical signal, thereby reducing or eliminating the effect of polarization mode dispersion. For example, a single-polarization optical fiber (an optical fiber in which one polarization component is significantly attenuated) could be used to filter the optical signal. Other devices useful for this purpose, such as filters and polarizing beamsplitters, are well known to those having ordinary skill in the art.

Once the effects of polarization mode dispersion have been compensated for, the optical signal is generally passed on to the next element of the communications network.

Input for controller 350 may be in the form of information about the state or degree of polarization of the input optical signal. Alternatively, this input may be in the form of an error signal supplied by the other network components or derived from light that is sampled after polarization transformer 310, or after delay system 320.

In one embodiment of the feedback and control system for polarization mode dispersion compensator 300, a portion of the optical signal is split off or sampled by optical tap 330. Optical tap 330 generally includes one or more beamsplitters that pass a portion of the optical signal to detector 340. Detector 340 uses one or more photodetectors and associated error signal circuitry to convert the optical signal into one or more error signals for use by controller 350.

Controller 350 uses the input signals to determine control signals that are sent to polarization transformer 310. The input signals received can be amplified, filtered, or processed in any other way necessary to produce appropriate control signals for polarization transformer 310. Moreover, controller 350 can include one or more separate controllers for the various retarding elements included in polarization transformer 310. The control signals are used to adjust the various retarders in polarization transformer 310, thereby producing the desired polarization transformation. In one example, the controller adjusts the polarization transformation induced by polarization transformer 310 so as to minimize the error signal received from detector 340 and thus maximize the strength of the optical signal emerging from delay system 320. Various types of controller devices and feedback schemes will be known and understood by those of ordinary skill in the art.

Figure 4:
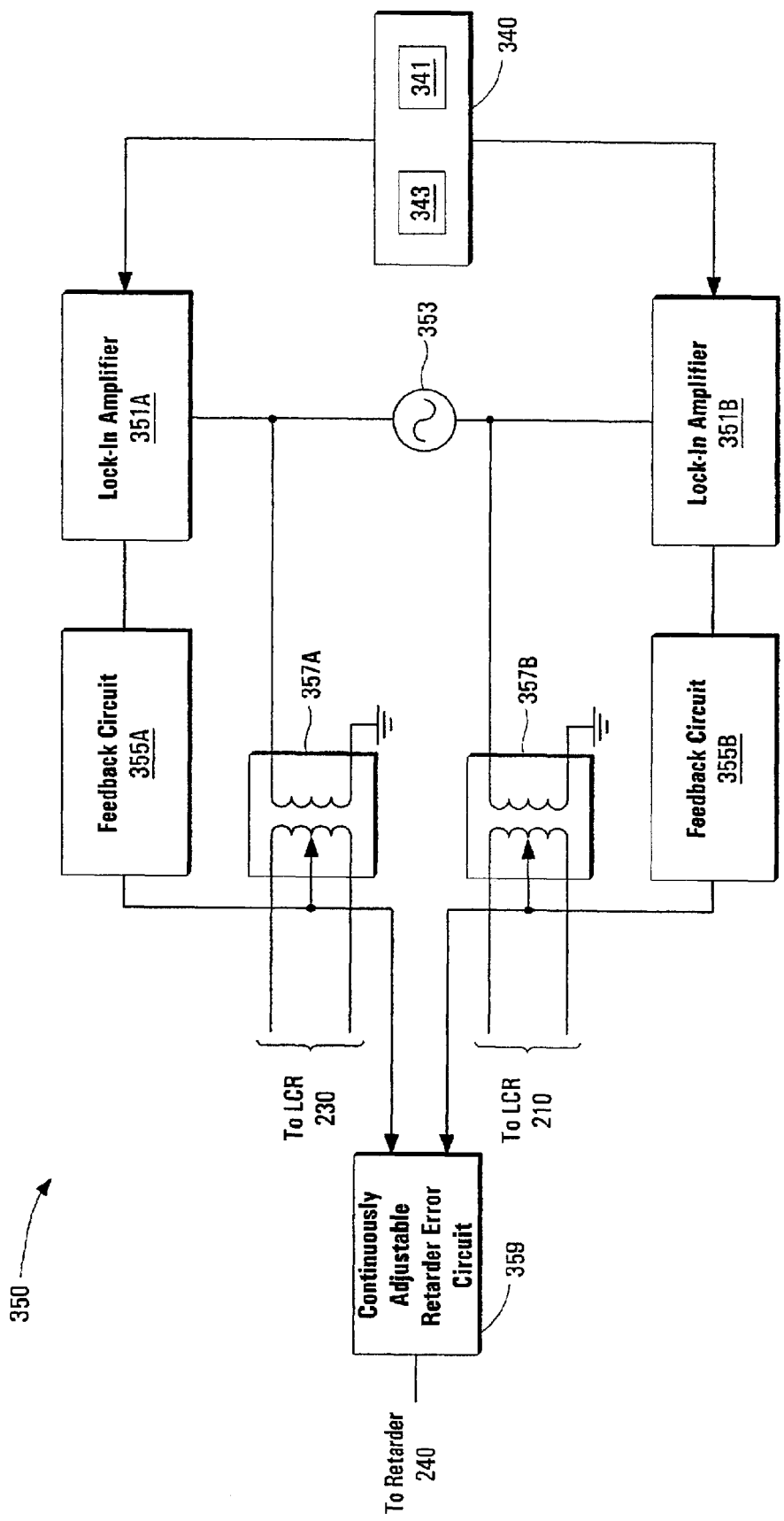
FIG. 4 illustrates a block diagram of the polarization transformer controller shown in FIG. 3.

FIG. 4 illustrates a block diagram of one embodiment of controller 350. In this example, controller 350 is designed to provide control signals to a polarization transformer such as polarization transformer 200 illustrated in FIG. 2. As in FIG. 3, detector 340 generates one or more error signals based on the portion of the optical signal sampled by optical tap 330. Photodetector 341 and error signal circuit 343 provide an error signal based on the detected optical signal. The error signal is sent to lock-in amplifiers 351A and 351B which amplify the error signal and separate it from other noise in the signal. Each of lock-in amplifiers 351A and 351B utilize a reference signal generated by oscillator 353. As is well known in the art, oscillator 353 can be a standalone function generator, a reference source internal to the lock-in amplifiers, or any other appropriate reference signal generator. Lock-in amplifiers 351A and 351B can utilize the same reference signal, reference signals differing only by a phase shift, or different reference signals. Feedback circuits 355A and 355B further process the error signals amplified by lock-in amplifiers 351A and 351B. For example, feedback circuits 355A and 355B can implement one or more of proportional, integral, and derivative (PID) control actions.

The output signals from feedback circuits 355A and 355B are then used to control voltage sources (357A and 357B) that supply control voltages to, for example, liquid crystal retarders 230 and 210. In one example, voltage sources 357A and 357B are simple transformer circuits as illustrated.

In operation, each of the liquid crystal retarders 230 and 210 are dithered about a set voltage. The oscillation frequencies can be up to hundreds kHz, generally depending on the response of the liquid crystal retarders 230 and 210 and the presence of other frequency signals in the overall system. Liquid crystal retarders 230 and 210 can each be dithered about the same frequency or different frequencies as appropriate. In an example where both retarders 230 and 210 are dithered about the same frequency, a 90° phase shift can be introduced between the two reference signals for proper phase detection. In phase variation in the error signals are detected by lock-in amplifiers 351A and 351B and developed by feedback circuits 355A and 355B. Exemplary parameters for this system include: 4 ms to 1 s integration times, 0.05 to 0.8 V dithering voltages, and 2 kHz dithering frequency. Other control schemes and parameters will be well known to those having ordinary skill in the art. For example, one lock-in amplifier can be used particularly if the same dithering frequencies (subject to an appropriate phase shift) are used for liquid crystal retarders 230 and 210.

In the configuration illustrated in FIG. 4, the continuously adjustable retarder (e.g., half-wave plate 240) is controlled by a signal based on the output of feedback circuits 355A and 355B and further developed by continuously adjustable retarder error circuit 359. For example, if rotatable half-wave plate 240 uses a motorized rotation mount, circuit 359 can use the output of one or both of feedback circuits 355A and 355B to produce a motor control signal that will rotate wave plate 240 in a direction where liquid crystal retarder 210 maximizes the detected signal. Ultimately, this will cause the control voltage applied liquid crystal retarder 210 to either decrease or return to a value representative of the center point of the retarder's tuning range. Thus, continuously adjustable retarder error circuit 359 may have to scale received signals to values appropriate for controlling retarder 240. In another example, continuously adjustable retarder error circuit 359 generates an error signal based on the voltage values for both liquid crystal retarders 230 and 210. Such an error signal can be determined by or proportional to the sum of the squares of the two voltage values. Other control schemes will be understood by those having ordinary skill in the art.

Although the present invention has been described with respect to a specific preferred embodiment thereof, various changes and modifications may be suggested to one skilled in the art and it is intended that the present invention encompass such changes and modifications within the scope of the appended claims.

What is claimed is:

1. A polarization transformer operable to reorient polarization components of an incident optical signal, the polarization transformer comprising:
   a continuously adjustable retarder operable to provide reset-free operation and continuous control of a polarization state of the optical signal; and
   a limited-range adjustable retarder located in optical communication with the continuously adjustable retarder and operable to provide limited-range control of the polarization state of the optical signal, wherein the limited range adjustable retarder has a first response time and the continuously adjustable retarder has a second response time, the first response time being shorter than the second response time.

2. The polarization transformer of claim 1 wherein the continuously adjustable retarder includes a wave plate.

3. The polarization transformer of claim 2 wherein the wave plate is a half-wave plate.

4. The polarization transformer of claim 2 wherein the continuously adjustable retarder includes:
   a motorized rotatable mount coupled to the wave plate, wherein the motorized rotatable mount is operable to continuously rotate the wave plate about an axis normal to a surface of the wave plate.

5. The polarization transformer of claim 1 wherein the continuously adjustable retarder is located with respect to the limited-range adjustable retarder so as to receive the optical signal from an optical source and to transfer a transformed optical signal to the limited-range adjustable retarder.

6. The polarization transformer of claim 1 wherein the limited-range adjustable retarder includes a liquid crystal retarder having at least one liquid crystal cell.

7. The polarization transformer of claim 6 wherein the at least one liquid crystal cell includes:
   a first substantially transparent window;
   a second substantially transparent window; and
   a liquid crystal medium located between the first substantially transparent window and the second substantially transparent window.

8. The polarization transformer of claim 6 wherein the liquid crystal retarder includes a plurality of electrodes for applying a voltage to the at least one liquid crystal cell.

9. The polarization transformer of claim 6 wherein the liquid crystal cell includes a liquid crystal material.

10. The polarization transformer of claim 9 wherein the liquid crystal material is a nematic liquid crystal material.

11. The polarization transformer of claim 9 wherein the liquid crystal material is a ferroelectric liquid crystal material.

12. The polarization transformer of claim 11 wherein the liquid crystal material is a fluorinated ferroelectric liquid crystal material.

13. The polarization transformer of claim 6 wherein the at least one liquid crystal cell includes a first liquid crystal cell, a second liquid crystal cell, and a third liquid crystal cell.

14. The polarization transformer of claim 13 wherein the first liquid crystal cell and the third liquid crystal cell transform the polarization state of the optical signal in a first direction, and wherein the second liquid crystal cell transforms the polarization state of the optical signal in a second direction.

15. The polarization transformer of claim 6 wherein the limited-range adjustable retarder includes:
   a second liquid crystal retarder having at least one liquid crystal cell and being located in optical communication with the liquid crystal retarder; and
   a quarter-wave plate located between and in optical communication with the liquid crystal retarder and the second liquid crystal retarder.

16. The polarization transformer of claim 1 wherein the limited-range adjustable retarder includes at least one of a lithium niobate crystal, a lanthanum modified lead zirconate titanate (PLZT) material, and a mechanically stressed optical fiber.

17. The polarization transformer of claim 1 wherein the limited-range adjustable retarder is located with respect to the continuously adjustable retarder so as to receive the optical signal from an optical source and to transfer a transformed optical signal to the continuously adjustable retarder.

18. The polarization transformer of claim 1 further comprising:

a controller operable to provide control signals to the limited-range adjustable retarder and to the continuously adjustable retarder.

19. A system for compensating for polarization mode dispersion in an optical signal, the system comprising:

a polarization transformer operable to reorient polarization components of an incident optical signal, the polarization transformer including:
 a continuously adjustable retarder operable to provide reset-free operation and continuous control of a polarization state of the optical signal; and
 a limited range adjustable retarder located in optical communication with the continuously adjustable retarder and operable to provide limited-range control of the polarization state of the optical signal, wherein the limited range adjustable retarder has a first response time and the continuously adjustable retarder has a second response time, the first response time being shorter than the second response time;

a delay system operable to adjust the relative delay between a first reoriented polarization component of the optical signal and a second reoriented polarization component of the optical signal; and a controller coupled to the polarization transformer and operable to provide control signals to the limited-range adjustable retarder and the continuously adjustable retarder.

20. The system of claim 19 wherein the continuously adjustable retarder includes a wave plate.

21. The system of claim 20 wherein the wave plate is a half-wave plate.

22. The system of claim 20 wherein the continuously adjustable retarder includes:

a motorized rotatable mount coupled to the wave plate, wherein the motorized rotatable mount is operable to continuously rotate the wave plate about an axis normal to a surface of the wave plate.

23. The system of claim 19 wherein the limited-range adjustable retarder includes a liquid crystal retarder having at least one liquid crystal cell.

24. The system of claim 23 wherein the liquid crystal retarder includes a plurality of electrodes for applying a voltage to the at least one liquid crystal cell.

25. The system of claim 23 wherein the liquid crystal cell includes at least one of a nematic liquid crystal material, a ferroelectric liquid crystal material, and a fluorinated liquid crystal material.

26. The system of claim 23 wherein the limited-range adjustable retarder includes:

a second liquid crystal retarder having at least one liquid crystal cell and being located in optical communication with the liquid crystal retarder; and a quarter-wave plate located between and in optical communication with the liquid crystal retarder and the second liquid crystal retarder.

27. The system of claim 19 wherein the limited-range adjustable retarder includes at least one of a lithium niobate crystal, a lanthanum modified lead zirconate titanate (PLZT) material, and a mechanically stressed optical fiber.

28. The system of claim 19 wherein the delay system is located with respect to the polarization transformer so as to receive the first reoriented polarization component of the optical signal and the second reoriented polarization component of the optical signal from the polarization transformer.

29. The system of claim 19 wherein the delay system includes a polarization maintaining optical fiber.

30. The system of claim 19 wherein the delay system includes at least one of mechanically stressed optical fiber and a heated optical fiber.

31. The system of claim 19 further comprising:

a detector coupled to the controller; and an optical tap operable to provide at least a portion of the optical signal to the detector.

32. The system of claim 31 wherein the optical tap includes a beamsplitter.

33. The system of claim 31 wherein the detector includes:

a photodetector; and an error signal circuit.

34. The system of claim 19 wherein the controller includes:

at least one amplifier for amplifying and detecting an error signal related to the intensity of the optical signal; and at least one voltage source coupled to receive the error signal and to provide a voltage based on the error signal to the polarization transformer.

35. The system of claim 34 wherein the at least one amplifier is a lock-in amplifier.

* * * * *